(12) United States Patent
Acocella et al.

(10) Patent No.: US 7,233,334 B1
(45) Date of Patent: Jun. 19, 2007

(54) STORAGE BUFFERS WITH REFERENCE COUNTERS TO IMPROVE UTILIZATION

(75) Inventors: Dominic Acocella, Blainville (CA); Henry Packard Moreton, Woodside, CA (US); Robert W. Gimby, West Bloomfield, MI (US); Thomas H. Kong, Los Altos, CA (US); Andrew D. Bowen, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 455 days.

(21) Appl. No.: 10/955,779

(22) Filed: Sep. 29, 2004

(51) Int. Cl.
*G06F 13/14* (2006.01)
(52) U.S. Cl. ...................................................... 345/519
(58) Field of Classification Search ................ 345/519; 711/159
See application file for complete search history.

(56) References Cited

U.S. PATENT DOCUMENTS 6,268,875 B1 *  7/2001  Duluk et al. ................ 345/506
6,437,779 B1 *  8/2002  Saito et al. .................. 345/420
6,476,808 B1 * 11/2002  Kuo et al. ................... 345/422
6,552,723 B1 *  4/2003  Duluk et al. ................ 345/419

* cited by examiner

*Primary Examiner*—Kee M. Tung
*Assistant Examiner*—Daniel Washburn
(74) *Attorney, Agent, or Firm*—Townsend and Townsend and Crew LLP; J. Matthew Zigmant (57) ABSTRACT

Accordingly, embodiments of the present invention provide circuits, methods, and apparatus that improve utilization of storage buffers by overwriting data in them as soon as the data is no longer needed. An exemplary embodiment employs a counter to add each time a particular unit of data is needed by a circuit. The counter also subtracts each time the data is actually used by the circuit. When the counter reaches zero, upstream circuitry is checked to see if a command allowing the particular data to be overwritten has been issued. If it has, the command is not waited for, rather the data may be overwritten immediately. Embodiments of the present invention may also make use of one level of indirection to mask physical storage buffer locations from upstream circuitry. In this way, utilization can be improved.

21 Claims, 6 Drawing Sheets

STORAGE BUFFERS WITH REFERENCE COUNTERS TO IMPROVE UTILIZATION

BACKGROUND

The present invention relates to integrated circuits including graphics processors generally, and more particularly to the efficient utilization of storage buffers in graphics processors.

Graphics processors form images for display on computer monitors by processing primitives. These primitives each form a portion of the image and are typically points, lines, and triangles. Each of these primitives are defined by their endpoints, which are referred to as vertices.

Each vertex is defined by data including its position, color, and other attributes. In advanced processors, this data is very large, and can be over a hundred or hundreds of bits in size. Accordingly, storing these vertices requires a large amount of circuitry. This circuitry consumes die area, thus increasing circuit cost and layout complexity, and also increasing circuit power dissipation.

These vertices undergo several stages of processing during the generation of an image for display. As such, they are stored at various times during this processing. Each time these vertices are stored, these large storage circuits are required. If more efficient use of the storage circuits could be made, the number of storage circuits could be reduced.

Thus, what is needed are circuits, methods, and apparatus that utilize these storage buffers more efficiently, thereby reducing the number of storage buffers that need to be included on a graphics processor integrated circuit. This reduction reduces circuit cost and die area, simplifies its layout, and reduces its power dissipation.

SUMMARY

Accordingly, embodiments of the present invention provide circuits, methods, and apparatus that improve utilization of storage buffers by overwriting their data as soon as it is no longer needed. An exemplary embodiment employs a counter to count each time a particular unit of data, for example a vertex, is going to be needed by a circuit. The counter subtracts from this number each time the data is actually used by the circuit. When the counter reaches zero, upstream circuitry is checked to see if a command allowing the particular data to be overwritten has been issued. If it has, the command is not waited for, rather the data may be overwritten immediately.

When a storage buffer is made available early in this manner, it might not be utilized if the upstream circuitry does not direct new data to be written to it. Accordingly, embodiments of the present invention may make use of one level of indirection to mask physical storage buffer locations from upstream circuitry. In this way, upstream circuitry can act as though more physical buffers are available to it than are actually located on the chip. This helps prevent upstream stalling and increases circuit utilization and throughput. Embodiments of the present invention may incorporate one or more of these or the other features described herein.

An exemplary embodiment of the present invention provides an integrated circuit. This integrated circuit includes a first circuit configured to receive and process data, and comprising a plurality of storage buffers for storing and providing processed data, a first plurality of second circuits, each second circuit associated with one of the storage buffers, a third circuit configured to receive commands including commands to reuse the storage buffers, and a fourth circuit configured to use processed data provided by the storage buffers. Each second circuit indicates whether data stored in a corresponding storage buffer is needed, and when a second circuit indicates that data stored in a first corresponding storage buffer is not needed and a command to reuse the first storage buffer is received by the third circuit, the first storage buffer may be reused.

Another exemplary embodiment provides a method of storing vertex data. This method includes receiving a plurality of vertices, counting a first number of times a first vertex in the plurality of vertices is needed, processing the first vertex, generating a command to store the processed first vertex in a first location, counting a second number of times the stored processed first vertex is used, and storing the processed first vertex until the second number is equal to the first number and a command to release the processed first vertex in the first location is generated.

A further exemplary embodiment of the present invention provides a graphics processor. This graphics processor includes a first circuit configured to receive primitives comprising one or more vertices, provide vertices, and provide commands to store and release processed vertices, a second circuit configured to receive vertices from the first circuit and process the vertices, a plurality of storage buffers configured to store and provide processed vertices, a third circuit configured to use processed vertices provided by the storage buffers, and a plurality of fourth circuits. Each of the fourth circuits are configured to determine a difference between a first number of times a first vertex is included in a primitive received by the first circuit and a second number of times a first processed vertex is provided by a storage buffer.

A better understanding of the nature and advantages of the present invention may be gained with reference to the following detailed description and the accompanying drawings.

DESCRIPTION OF EXEMPLARY EMBODIMENTS

Figure 1:
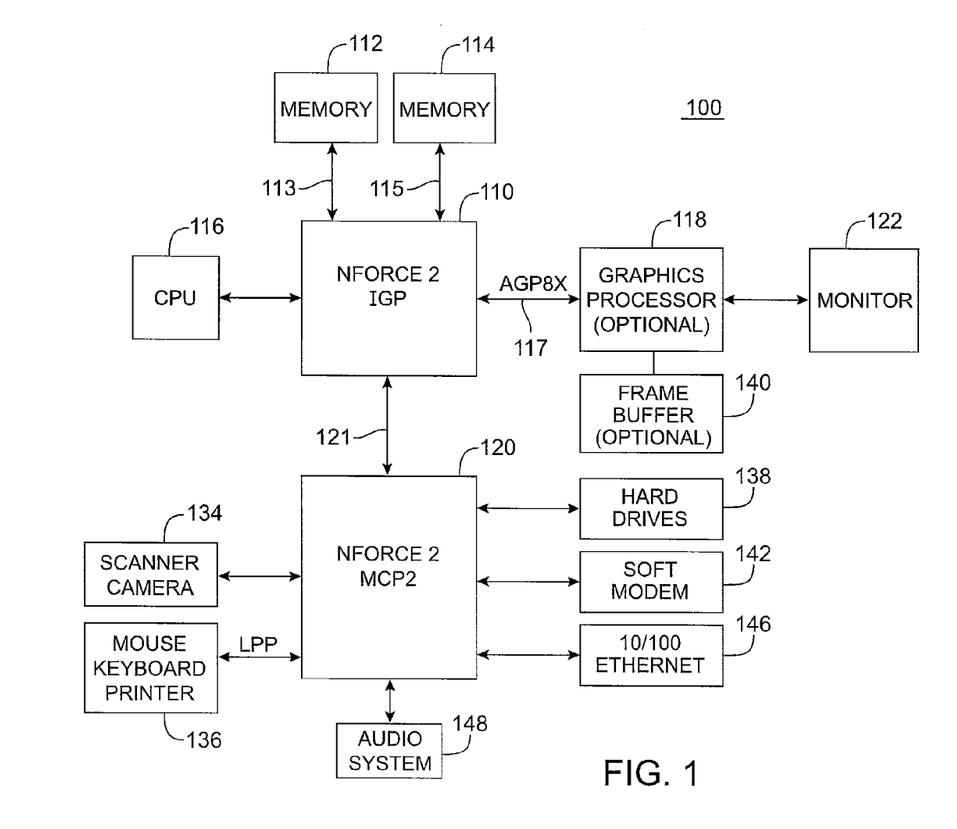
FIG. 1 is a block diagram of an improved computer system 100 that benefits by the incorporation of embodiments of the present invention.

FIG. 1 is a block diagram of an improved computer system 100 that benefits by the incorporation of embodiments of the present invention. The improved computer system 100 includes an NVIDIA nForce™2 integrated graphics processor (IGP) 110, an nForce2 media communications processor (MCP2) 120, memory 112 and 114, CPU 116, optional graphics processor 118 and frame buffer 140, monitor 122, scanner or camera 134, mouse, keyboard, and printer 136, hard drives 138, soft modem 142, Ethernet network or LAN 146, and audio system 148.

This revolutionary system architecture has been designed around a distributed processing platform, which frees up the CPU to perform tasks best suited to it. Specifically, the nForce2 IGP 110 includes a graphics processing unit (GPU) (not shown) which is able to perform graphics computations previously left to the CPU 116. Alternately, the nForce2 IGP 110 may interface to an optional GPU 118 which performs these computations. Also, nForce2 MCP2 120 includes an audio processing unit (APU), which is capable of performing many of the audio computations previously done by the CPU 116. In this way, the CPU is free to perform its tasks more efficiently. Also, by incorporating a suite of networking and communications technologies such as USB and Ethernet, the nForce2 MCP2 120 is able to perform much of the communication tasks that were previously the responsibility of the CPU 116.

In this architecture, the nForce2 IGP 110 communicates with memories 112 and 114 over buses 113 and 115. The nForce2 IGP 110 also interfaces to an optional graphics processor 118 over an advanced AGP bus 117. In various computer systems, optional processor 118 may be removed, and the monitor 122 may be driven by the nForce2 IGP 110 directly. In other systems, there may be more than one monitor 122, some or all of which are coupled to optional graphics processor 118 or the nForce2 IGP 110 directly. The nForce2 IGP 110 communicates with the nForce2 MCP2 120 over a HyperTransport™ link 121. The optional graphics processor 118 may also interface with external memory, which is not shown in this example.

The nForce2 MCP2 120 contains controllers for Ethernet connections 146 and soft modem 142. The nForce2 MCP 120 also includes interfaces for a mouse, keyboard, and printer 136, and USB ports for cameras and scanners 134 and hard drives 138.

This arrangement allows the CPU 116, the nForce2 IGP 110, and the nForce2 MCP2 120, to perform processing independently, concurrently, and in a parallel fashion.

Figure 2:
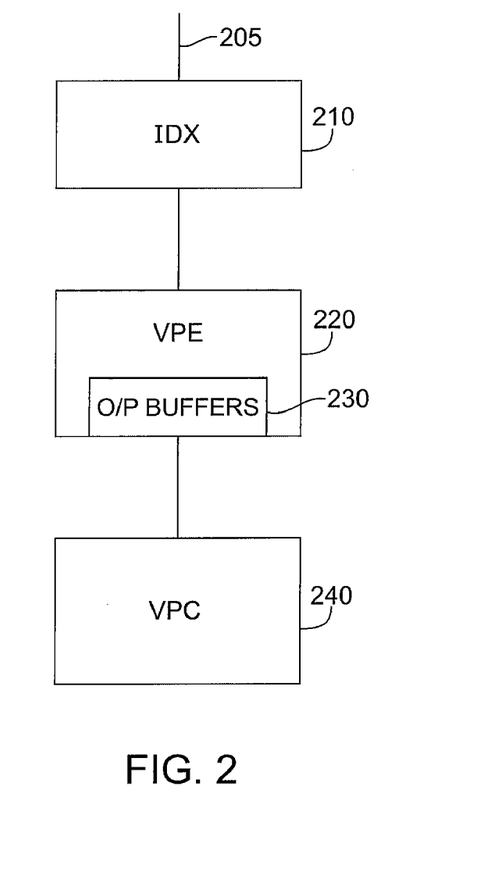
FIG. 2 is a block diagram of a portion of a graphics processor that may be improved by incorporation of embodiments of the present invention.

FIG. 2 is a block diagram of a portion of a graphics processor such as the graphics processor 118, a graphics processor included in the nForce2 IGP 110, or other graphics processor that may be improved by incorporation of embodiments of the present invention. While embodiments of the present invention may be utilized by other circuits than a graphics processor, and by other circuits within a graphics processor, embodiments of the present invention are well suited to improving the functionality of the circuitry shown in this and the other figures.

This figure includes an index circuit or DX 210, vertex processing engine VPE 220, and viewport and culling circuit VPC 240. This figure, as with all the included figures, is shown for illustrative purposes only and does not limit either the possible embodiments of the present invention or the claims.

The index circuit DX 210 receives primitives such as points, lines, and triangles, and provides vertex information to the vertex processing engine VPE 220. This vertex information may include x, y, and z location information, r, g, b, and alpha color information, as well as other attributes. The vertex processing engine receives this vertex information, processes it, and provides processed vertex information to the storage buffers 230. The storage buffers 230 in turn provide the processed vertex information to the VPC 240.

Each vertex of a primitive may be shared by other primitives. Accordingly, once a vertex has been supplied to the VPE 220, it is not supplied again. This prevents redundant processing of vertices by the VPE 220. Because of this, once a vertex has been processed and is available at a storage buffer 230, it needs to remain stored there until other primitives including that vertex have been received and processed.

But the processed data for each vertex can be very large, for example over a hundred or even hundreds of bits, and as graphics processors improve, this number is likely to increase. Thus, storing this vertex data requires a great deal of circuitry, which requires die area, thus increasing the cost of manufacturing a graphics processor.

Because of this, it is desirable to not store the processed vertices any longer than necessary. If the storage buffers are reused as soon as possible, fewer storage buffers are needed. While it is necessary to store a processed vertex until all of its associated primitives have been processed, it is also desirable to overwrite, or release, that is allow for overwriting, the storage buffer storing the processed vertex as soon as possible. One such vertex and its associated primitives are described by the next figure.

Figure 3:
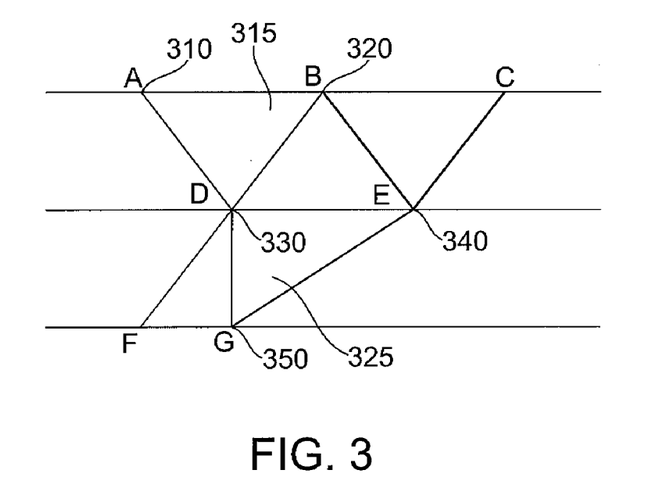
FIG. 3 is a portion of a graphics image that may be processed by the circuit of FIG. 2.

FIG. 3 is a portion of a graphics image that may be processed by the circuit of FIG. 2. Included are several primitives, in this specific example triangles, defined by a number of vertices A 310, B 320, D 330, E 340, and G 350. For example, triangle 315 is defined by vertices A 310, B 320, and D 330, while triangle 325 is identified by vertices for D 330, E 340, and G 350.

Primitives, such as triangles 315 and 325, are received by the index circuit DX 210. The vertex information for the triangles is then provided to the vertex processing engine VPE 220, which processes these vertices. These vertices are then stored in the storage buffers 230

As an example, an image or image portion including triangle 315 followed by triangle 325 is received by the IDX 210. Vertices A 310, B 320, and D 330 are provided by the IDX 210 and processed by the vertex processing engine VPE 220, then stored in the storage buffers 230. At this point, the information needed by the viewport and culling circuit VPC 240 to further process triangle 315 is available at the storage buffers 230.

Sometime later, vertices E 340 and G 350 are provided to the VPE 220 by the IDX 210. After processing, they may be stored in the locations occupied by processed vertices A 310, B 320, or other locations. The storage buffer occupied by D 330 is not overwritten. At this point, the information needed by the viewport and culling circuit VPC 240 to further process triangle 325 is available at the storage buffers 230.

As can be seen, the vertex information for vertex D 330 should remain stored in the storage buffers 230 until triangle 325 has been processed. Accordingly, it is desirable to maintain the vertex information for vertex D 330 in the storage buffers 230 until the processing of each of its associated triangles is completed. Once the vertex information for vertex D 330 is no longer needed, the IDX 210 instructs the storage buffers 230 to release or overwrite the information in the particular storage buffer that had been storing the vertex information for vertex D 330.

Again, the vertex information stored in the storage buffers 230 is typically quite large. Because of this, it is desirable to limit the number of storage buffers 230 included in the vertex processing engine VPE 220 to save on die area, power dissipation, and device costs. However, if every storage buffer 230 is full, no further vertices may be processed by the vertex processing engine 220 until some of the storage buffers are released. That is, if the information in each storage buffer is needed by other primitives having vertices in the vertex processing engine VPE 220, no further vertices can be accepted by the vertex processing engine VPE 220 until some currently active vertex processing is complete and the storage buffers may be reused.

The condition outlined above is referred to as an upstream stall. This is undesirable since it slows the processing of vertices through the vertex processing engine 220. Accordingly embodiments of the present invention seek to determine the earliest time a storage buffer may be released to store other vertex information.

Figure 4:
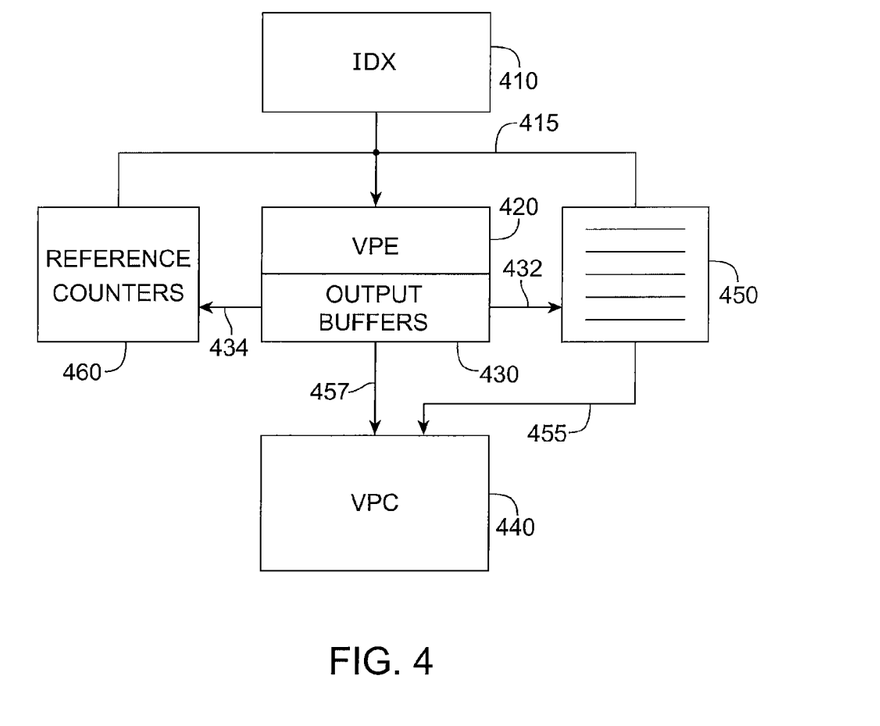
FIG. 4 is a block diagram of a portion of a graphics processor consistent with an embodiment of the present invention.

FIG. 4 is a block diagram of a portion of a graphics processor consistent with an embodiment of the present invention. Included are an index circuit IDX 410, vertex processing engine VPE 420, storage buffers 430, viewport and culling circuit VPC 440, command FIFO (first-in-first-out memory) 450, and reference counters 460.

In short, the reference counters 460 track how many times a particular vertex is needed by the viewport and culling circuit VPC 440. In a specific embodiment, this is done by incrementing by one each time a primitive including a particular vertex is processed by the IDX 410, and decrementing by one each time the viewport and culling circuit 440 access the processed vertex in the storage buffers 430.

When the count goes to zero, the command FIFO 450 is checked to see if a release command has been issued by the index circuit 410. If both of these conditions are met, the storage buffer 430 may be released. This is the earliest release that ensures that needed data will not be overwritten, and it occurs earlier than it would have if the storage buffers 430 simply waited for the command issued by the index circuit 410 to reach them. This early release helps prevent upstream stalls from occurring and helps to increase data throughput through the vertex processing engine VPE 420. In another embodiment, pending release commands are tracked or stored in a database, and the database is searched for release commands issued by the IDX instead of the FIFO 450.

More specifically, primitives, such as points, lines, and triangles are received by the index circuit IDX 410, as discussed above. The index circuit IDX 410 also generates commands for the downstream circuits. Of particular interest, the index circuit 410 generates release commands for the storage buffers 430 in the vertex processing engine VPE 420.

In a typical embodiment, the vertex processing engine VPE 420 includes several circuits that perform various functions on the vertex information in series. Because of this pipelined structure, the vertex processing takes multiple clock cycles to occur. Accordingly, associated commands are delayed multiple clock cycles through the FIFO 450 such that they are properly timed with their corresponding vertex data at the output of the vertex processing engine VPE 420. Again, of particular interest, the release command for the storage buffers are delayed through the FIFO 450 to ensure that the storage buffers are not released before the associated primitives have been provided to the viewport and culling circuit VPC 440. In the specific example of FIG. 3, vertex D 330 is held in the storage buffers 430 until the processing of triangle 325 is complete and the processed vertices are read by the viewport and culling circuit 440.

The reference counters 460 keep track of the information in each of the storage buffers 430. Specifically, each time the information in one of the storage buffers 430 is needed by a primitive in the IDX 410, the associated reference counter is incremented. Further, each time the vertex information is provided by the storage buffers 430 to the viewport and culling circuit 440, the associated reference counter is decremented.

When the reference count reaches zero, the storage buffer might be in a condition to be released. Accordingly, the command FIFO 450 is examined to see if the index circuit IDX 410 has issued a release. If it has, then the vertex information in the storage buffer is no longer needed and may be overwritten or otherwise made available for new data. Again, this frees up the storage buffer sooner than if the storage buffer had waited for the command from the index circuit IDX 410 to reach it via the FIFO 450. This helps increase the utilization of the storage buffers 430 and helps prevent upstream stalls.

But this itself is not enough to increase the utilization of the storage buffers. This is because even though the storage buffers are freed up earlier than they would be if they waited for a release from the index circuit IDX 410 to exit the FIFO, the index circuit IDX 410 does not realize this and is not able to take advantage of this information to allocate another vertex to the newly freed buffer. The fact that a storage buffer is ready to be written to does no good if it is not actually written to.

Accordingly, embodiments of the present invention employ an address remapping technique to increase the utilization of the storage buffers. That is, one level of indirection is maintained between storage buffer addresses supplied by the index circuit IDX 410 and the numbering system used by the storage buffers 430 themselves. The storage buffer addresses supplied by the index circuit 410 are treated as virtual addresses, while the storage buffers 430 translate these to physical addresses. The translation table between virtual addresses used by the index circuit 410 and physical addresses used by the storage buffers 430 is updated as storage buffers 430 are written to and released.

In this way, utilization can be improved without the index circuit IDX 410 needing to know which buffers are still in use downstream. This increased utilization increases VPE 420 throughput by helping to reduce upstream stalls. Again, this is preferred to simply increasing the number of storage buffers since the storage buffers needed to store the processed vertex information are quite large.

Figure 5:
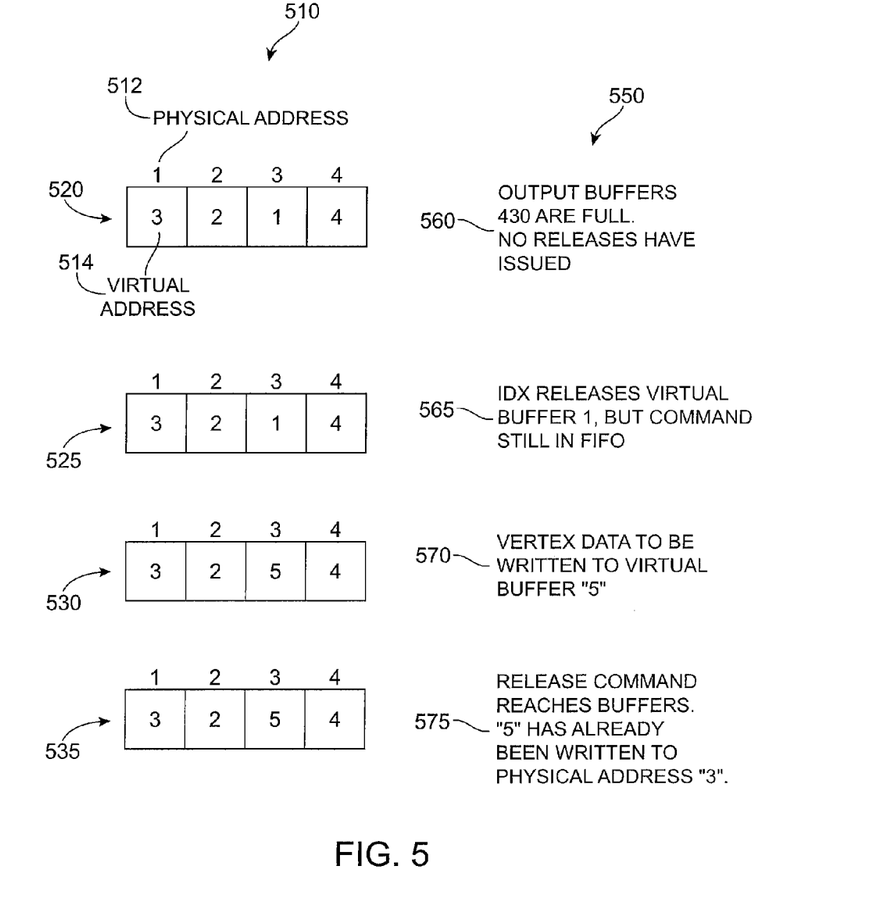
FIG. 5 illustrates a method of storage buffer address remapping consistent with an embodiment of the present invention.

FIG. 5 illustrates a method of storage buffer address remapping used by an embodiment of the present invention. Included in this figure is a column representing the storage buffers, such as the storage buffers 430, and a column of activities performed by related circuitry. Each of the buffers in column 510 have a physical addresses 512 and a virtual address 514. The physical addresses 512 do not change with time, while the virtual addresses are updated as processed vertices are stored and overwritten by the IDX circuit 410.

At 520, the physical addresses 1, 2, 3, and 4, are storing processed vertex data. The IDX circuit 410 has previously issued commands that vertex data be written into virtual addresses 3, 2, 1, and 4. At this time, the storage buffers 430 are full and no releases have been issued by the IDX circuit 410.

At 525, the DX 410 releases virtual buffer 1, but the command is still in the FIFO 450 and has not reached the storage buffer circuits yet. At 530, vertex data that has been instructed to be written into virtual buffer 5 is received at the storage buffers. The counter for physical address 3 is at zero, and accordingly the FIFO is checked for a release of the virtual buffer 1. When it is found, the vertex data for virtual buffer S may be written to physical buffer 3.

In this way, the storage buffers 430 does not have to wait for the release command for virtual buffer 1 to reach them, rather it was able to look ahead in the FIFO 450 and find the command to overwrite the vertex data in physical storage buffer 3. In this way, the vertex information associated with virtual buffer 5 is now ready for the viewport and culling circuit VPC 440, and no upstream stall was required.

At 535, the release command reaches the storage buffers. However, virtual address 5 has already been written to physical addresses 3, so no further activity is required.

Figure 6:
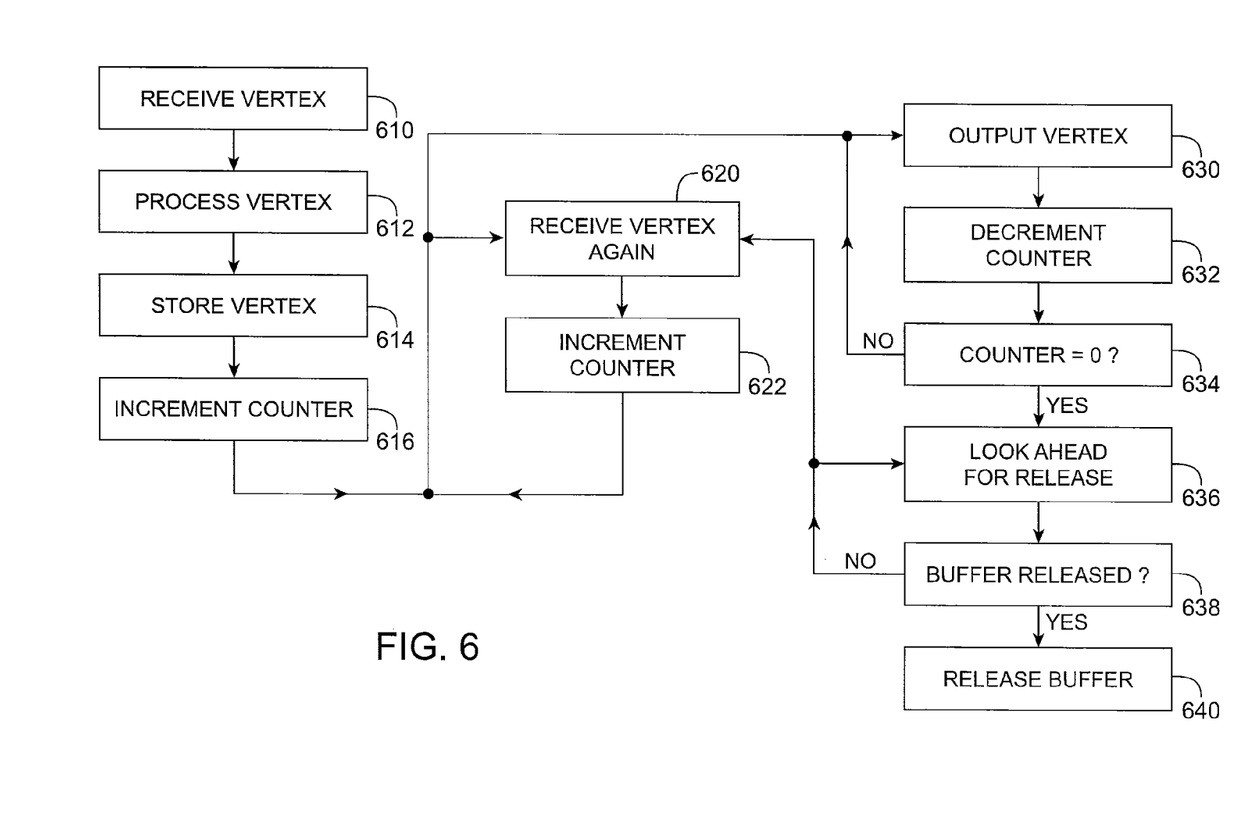
FIG. 6 is a flow chart of a method of managing storage buffers consistent with an embodiment of the present invention.

FIG. 6 is a flow chart of a method of managing output buffers consistent with an embodiment of the present invention. In act 610, a first primitive including a vertex is received. In act 612, the vertex is processed. When the processing is completed, the vertex is stored in a storage buffer in act 614, and in act 616 a counter corresponding to a storage buffer is incremented. At this point, the processed vertex is ready to be used.

The vertex is then either received again in act 620, or output in act 630. If the vertex is received again in act 620, the storage buffer's counter is incremented in act 622. If the vertex is output in act 630, the storage buffer's counter is decremented in act 632. In act 634, it is determined if the storage buffer's counter has reached zero. If it has not, then the vertex is either output again in act 630 or received again in act 620.

If the counter has reached zero in act 634, a look ahead is done searching for a corresponding release command in act 636. In act 638, it is determined whether the buffer has been released. If the buffer has not been released, then either it will be used again or released later, thus, the vertex is received again in act 620, or a command is issued in act 636. If the buffer has been released in act 638, then the output buffer can be released for reuse in act 640.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
   a first circuit to receive and process data, and comprising a plurality of storage buffers for storing and providing processed data;
   a plurality of second circuits, each second circuit associated with one of the storage buffers;
   a third circuit to receive commands including commands to release the storage buffers; and
   a fourth circuit to use processed data provided by the storage buffers,
   wherein each second circuit indicates whether data stored in a corresponding storage buffer is needed, and wherein when a second circuit indicates that data stored in a first corresponding storage buffer is not needed and a command to release the first storage buffer is received by the third circuit, the first storage buffer may be overwritten.

2. The integrated circuit of claim 1 wherein the received data is a plurality of vertices.

3. The integrated circuit of claim 2 wherein each of the first plurality of second circuits is a counter.

4. The integrated circuit of claim 3 wherein each counter counts a difference between a first number of times a first vertex is needed by the fourth circuit and a second number of times the first vertex is used by the fourth circuit.

5. The integrated circuit of claim 3 wherein each counter determines a difference between a first number of times a first vertex is included in a primitive received by a fifth circuit and a second number of times the first vertex is used by the fourth circuit.

6. The integrated circuit of claim 5 wherein the fifth circuit receives primitives and provides vertices to the first circuit and commands to release storage buffers to the third circuit.

7. The integrated circuit of claim 3 wherein the third circuit is a first-in-first-out memory.

8. The integrated circuit of claim 7 wherein when a counter counts to zero, the third circuit is checked for a command to release the corresponding storage buffer, and if there is a command to release the corresponding storage buffer in the third circuit, the corresponding storage buffer is released.

9. The integrated circuit of claim 1 wherein the integrated circuit is a graphics processor.

10. A method of generating and providing a graphics image, the method comprising:
    generating the graphics image by:
      receiving a plurality of vertices;
      counting a first number of times a first vertex in the plurality of vertices is needed;
      processing the first vertex;
      generating a command to store the processed first vertex in a first location;
      counting a second number of times the stored processed first vertex is used; and
      storing the processed first vertex until the second number is equal to the first number and a command to release the processed first vertex in the first location is generated; and
    providing the graphics image.

11. The method of claim 10 wherein the first vertex is included as a vertex in a first and second primitive each comprising a plurality of vertices, and the processed first vertex is stored until each of the plurality of processed vertices of the first primitive and the second primitive have been simultaneously stored in the storage buffers.

12. The method of claim 10 wherein the first vertex is included as a vertex for a third number of primitives, and the third number is equal to the first number.

13. The method of claim 10 wherein the first vertex is included as a vertex in a first primitive, and when each vertex of the first primitive is processed and stored in a storage buffer, the stored processed first vertex is used.

14. The method of claim 10 wherein the first location is a virtual location and the first vertex and the processed first vertex are stored in a physical location.

15. A graphics processor comprising:
    a first circuit to receive primitives each comprising one or more vertices, provide vertices, and provide commands to store and release processed vertices;
    a second circuit to receive vertices from the first circuit and process the vertices;
    a plurality of storage buffers to store and provide processed vertices;
    a third circuit to use processed vertices provided by the storage buffers; and
    a plurality of fourth circuits, where each determines a difference between a first number of times a first vertex is included in a primitive received by the first circuit and a second number of times a first processed vertex is provided by a storage buffer.

16. The graphics processor of claim 15 further comprising a fifth circuit to receive the commands to store and release processed vertices.

17. The graphics processor of claim 16 wherein the fifth circuit is a first-in-first-out memory.

18. The graphics processor of claim 17 wherein the each of the plurality of fourth circuits is a counter.

19. The graphics processor of claim 18 wherein when one of the counters reaches a predetermined count, and a command to release a corresponding storage buffer is stored in the first-in-first-out memory, the corresponding storage buffer is released.

20. The graphics processor of claim 19 wherein the predetermined count is zero.

21. The graphics processor of claim 15 wherein the graphics processor is formed on an integrated circuit.

* * * * *